United States Patent Office 2,993,328
Patented July 25, 1961

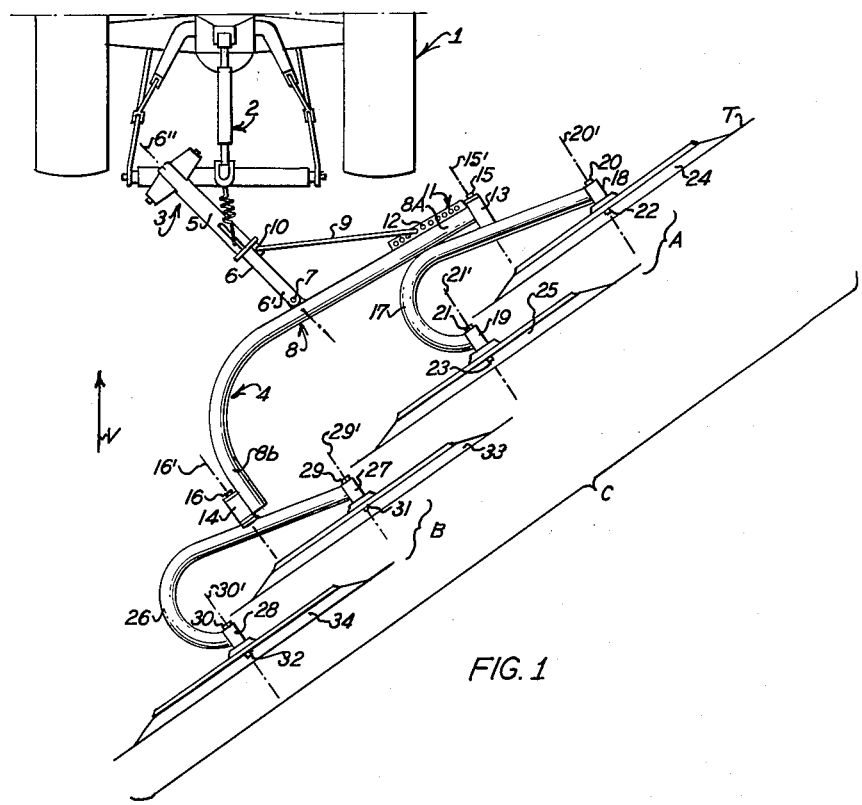
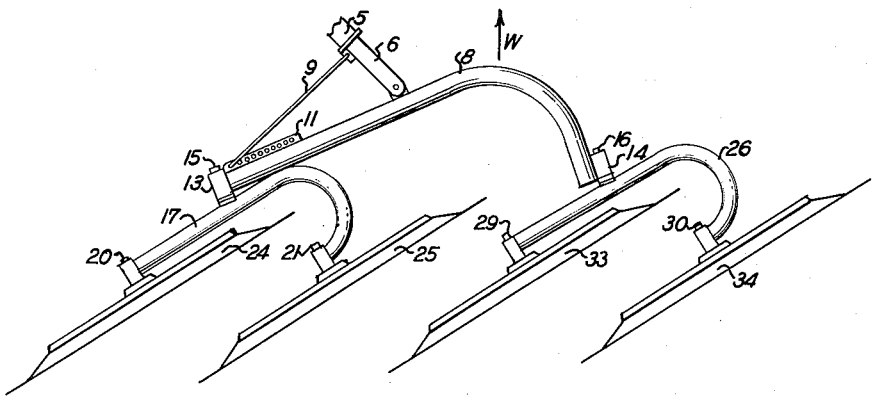

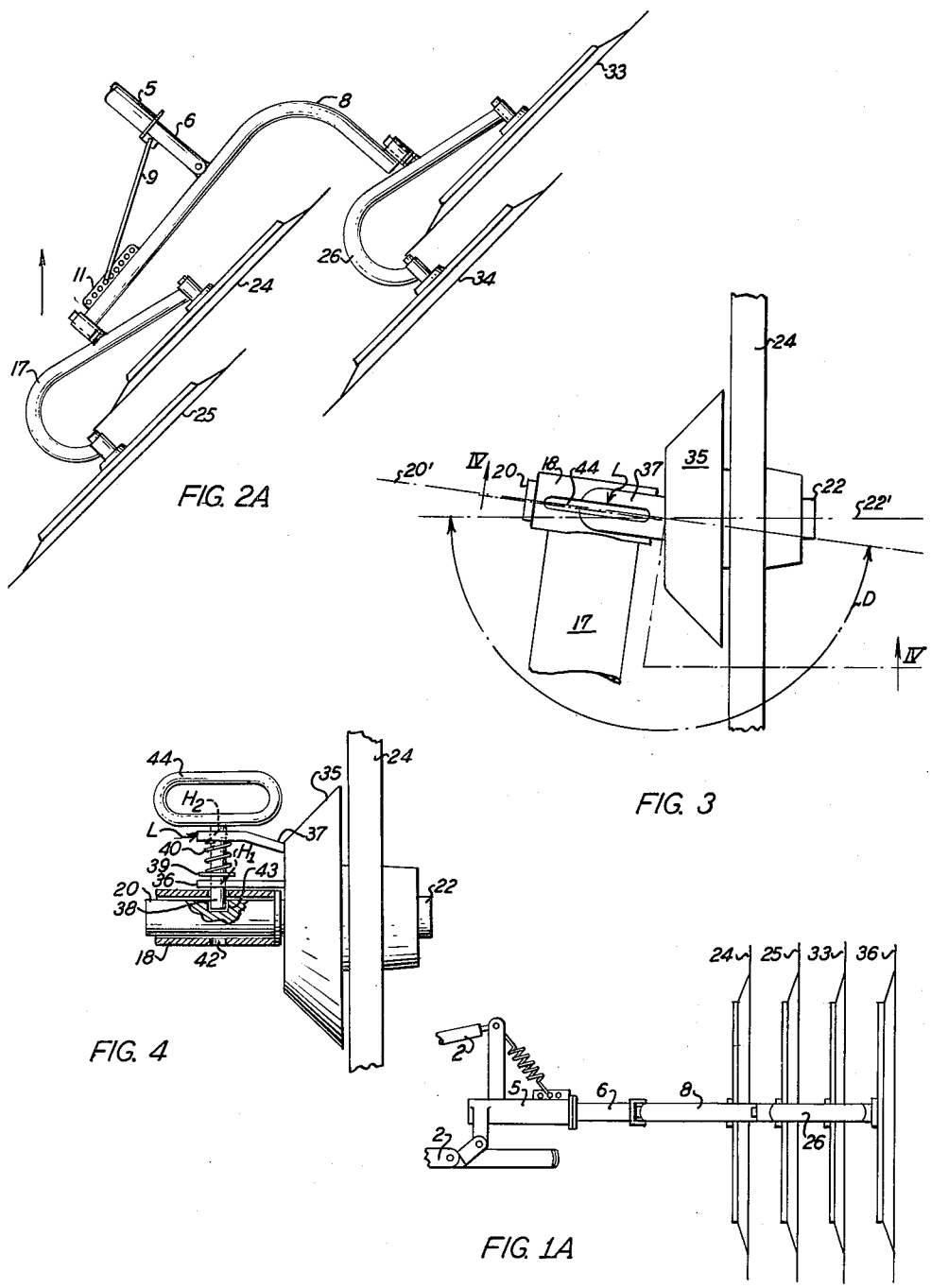

2,993,328
SIDE DELIVERY RAKING DEVICE
Cornelis van der Lely and Ary van der Lely, Maasland, Netherlands, assignors to C. van der Lely N.V., Maasland, Netherlands, a Dutch limited company of the Netherlands
Filed Sept. 30, 1957, Ser. No. 687,026
Claims priority, application Netherlands Feb. 9, 1957
11 Claims. (Cl. 56—377)

This invention relates to devices for the lateral displacement of material lying on the ground.

The invention contemplates the improvement of devices comprising, for example, a frame with a plurality of rake wheels capable of occupying at least two working positions, a number of the rake wheels being, in one working position, rotatable as an assembly through 180° about a first, substantially horizontal axis in order to attain a second working position.

In known devices of this kind, the distance between the planes of those rake wheels, which are rotated as an assembly about the horizontal axis to attain the various working positions, is the same in both or all the working positions. However, in some cases it is desirable to vary the distance between the planes of the rake wheels to be in one working position smaller or larger than in another working position.

The invention has as an object the provision of improvements to render the distance between the planes of the rake wheels in apparatus such as indicated above adjustable in a simple manner. In accordance with one embodiment of the invention, for example, there is provided a device for the lateral displacement of material lying on the ground and comprising a frame having a plurality of rake wheels, wherein at least some of the rake wheels are mounted so as to be turnable about a first substantially horizontal axis to bring the rake wheels from a first to a second working position. It is found that the distance between the rake wheels influences the form of the swathes. If the distance is increased in general a more aerated swath may be obtained. The distance between the planes of the rake wheels is made variable by supporting each rake wheel for rotation upon an axle or the like which is inclined with reference to a respective second substantially horizontal axis about which the rake wheel can also be turned, the second axis and the axis of said axle making an angle with one another.

Advantageously, a second substantially horizontal axis is present (the center line of which forms the second axis) which is directly connected with the axis or the like of a rake wheel, and is arranged in a supporting member, the axle of the rake wheel or the second shaft having a locking pin with a handle by means of which the second substantially horizontal shaft can be rotated and locked in the supporting member.

For a better understanding of the invention, a detailed description of an embodiment of the invention is next given, reference being made to the accompanying drawings in which:

FIGURE 1 is a plan view of a device, according to the invention, in a first working position in which the rake wheels acting together displace material to one side of a row of rake wheels.

FIGURE 1a is a side view of the device shown in FIGURE 1.

FIGURE 2 is a plan view of the device shown in FIGURE 1, but in a second working position in which each rake wheel individually displaces the material laterally.

FIGURE 2a shows a third working position of the device.

FIGURE 3 is, on an enlarged scale, a plan view of a detail of the device shown in FIGURE 1, and FIGURE 4 is a sectional view taken on the line IV—IV of FIGURE 3.

Referring to FIGURE 1, a tractor 1 is provided with a conventional lifting attachment 2, which supports a device 4, provided in accordance with the invention, by means of a coupling or first support means 3. The coupling 3 comprises a tube 5, which constitutes a bearing for a horizontal shaft 6. The rear end 6' of the horizontal shaft 6 supports a frame or beam 8 by means of a vertical pivot 7 in conventional manner. For such a connection see Pat. No. 2,602,280 (Crowe, July 8, 1952). The relative positions of the horizontal shaft 6 and the beam 8 are determined by a bar 9, which extends between a lug 10 on the horizontal shaft 6 and a strip 11 on the beam 8. Strip 11 is provided with a series of holes 12. The ends 8a and 8b of the beam 8 are provided with bearings or second support means 13 and 14, in which shafts 15 and 16 defining axes 15' and 16' are supported. The shaft or axle member 15 carries a beam 17, which is provided with two supporting means or sleeves 18 and 19 in which horizontal shafts 20 and 21 are mounted. These horizontal shafts 20 and 21 are extended by shaft or axle portions 22 and 23 constituting stub axles for rotationally supporting an assembly A of rake wheels 24 and 25. The axes of the stub axles being at an angle D of about 170° with respect to the axes of the shafts. For example, note axes 20' and 22' in FIGURE 3. The angle D is preferably at least 140° but less than 180°. The shaft 16 carries a beam or axle member 26, which has two supporting means or sleeves 27 and 28. In the latter are mounted substantially horizontal shafts 29 and 30, which similarly have stub axles 31 and 32 for rotationally supporting an assembly B of rake wheels 33 and 34, the axes 29' and 30' of these axles also being at an angle of about 170° with respect to the axes of stub axles 31 and 32. During the movement of the device in the direction shown by the arrow V, the assembly C of aligned rake wheels 24, 25, 33 and 34 (diagrammatically illustrated) will be caused to rotate because of their contact with the ground through ground engaging members such as tines T, and the crop to be moved will be displaced towards the left-hand side of the row of rake wheels.

The position shown in FIGURE 2 is obtained by rotating the shaft 6 through 180° in its bearing 5, the center line 6" of the shaft 6 constituting a first horizontal axis about which the complete assembly of rake wheels rotates. In the position shown in FIGURE 2 the device is moved in the direction of the arrow W. In order to insure the correct position of the rake wheels relative to the direction of movement W, the bar 9 is locked in an appropriate hole 12 of the strip 11. The rotation of the shaft 6 through 180° can be simply achieved with a lifting of the device 4 with the aid of the lifting arrangement 2 of the tractor. The horizontal shafts or axle means 20, 21, 29 and 30, the center lines of which constitute second horizontal axes 20', 21', 29' and 30', are then rotated through 180° in their sleeves 18, 19, 27 and 28. The rotation of these second horizontal shafts or axle portions 20, 21, 29 and 30, which are at an angle to the stub axles or axle portions 22, 23, 31 and 32 of the rake wheels, causes the distances between the planes of the rake wheels to change. This insures that the crop is displaced laterally by each individual rake wheel to locations between the planes of the rake wheels.

From the position shown in FIGURE 2, the device can be brought to a third working position (FIG. 2a) by turning the rake wheels 24 and 25 with the shaft 15 through 180° in the bearing 13, and by turning the rake wheels 33 and 34 with the shaft 16 through 180° in the bearing 14. In this third working position, the rake wheels 24 and 25 constitute a row of rake wheels which together work a narrow strip of ground and the rake wheels 33 and 34 constitute another row which works a further strip of ground. In this third working position, the distance between the planes of those rake wheels, which work one strip together, can be reduced by turning the rake wheels about their second horizontal shafts. When bringing the device from the working position of FIGURE 2 into the third working position, the shafts 15 and 16 may be regarded as "the first horizontal shafts" each associated with an assembly of rake wheels.

FIGURES 3 and 4 show in detail a simple locking device or means L for the connection of a rake wheel to a supporting sleeve and more particularly, by way of example, for the rake wheel 24 and the supporting sleeve 18. The beam 17 has fixed thereon the supporting sleeve 18 in which the horizontal shaft 20 is mounted. The horizontal shaft 20 is connected with the stub axle 22, which is at an angle of about 170° to the shaft 20. The axis 20' is the axis of rotation of the axle means 20. The stub axle 22, on which the rake wheel 24 is rotatable about the axis of rotation 22', is provided with a hood 35, which prevents the crop from being jammed between the stub axle and the hub of the rake wheel 24.

The hood or support 35 is provided with lugs 36 and 37, the free ends of which are provided with holes H1 and H2 through which a pin 38 can be entered. Between the lugs 37 and 37 and on the pin 38, a collar 39 is fixedly secured. A compression spring 40 surrounds the pin 38 from the lug 37 to the collar 39 so that the spring 40 tends to move the pin 38 in the direction of the supporting sleeve 18.

The lug 37 overlies the sleeve 18, which is formed with holes such as holes 41 and 42. By turning the shaft 22 with the pin 38 retracted, the latter can be displaced from hole to hole and the position of stub axle 22 is controlled. In this manner, the rake wheel can also be placed in an inclined position with respect to the ground by providing a suitable hole for pin 38. This inclined position can be such that the axle of the rake wheel makes a sharp or an obtuse angle with the direction of movement of the device.

Since the shaft 20, which moves with hood 35 and which is directly connected with stub axle 22, is formed with a hole or aperture 43, which is aligned with the holes or apertures in the lugs 36 and 37, the pin 38, when it has entered one of the holes 41 or 42, will also enter the hole 43, so that the shaft 20 is locked both against rotational and axial displacement in the supporting sleeve 18.

In order to turn the shaft 20 through 180° in the supporting sleeve, the pin 38 is withdrawn from the holes 43 and 41 (or 42) by means of a handle 44 secured thereto. By means of this same handle, the stub axle 22 with the shaft 20 can be turned through 180° in the supporting sleeve 18, after which the pin 38 will enter the hole 42 (or 41) to lock the shaft 20 in the new position. Owing to this simple fastening of a rake wheel to a supporting sleeve it is possible for storing the device to detach the rake wheels therefrom in a simple manner.

What we claim is:

1. A device for the lateral displacement of material lying on the ground, said device having a predetermined direction of travel and comprising a frame, a plurality of rake wheels mounted on said frame, at least one of said rake wheels being movable with a pivotal movement relative to a substantially horizontal axis, and means coupling selected of said rake wheels to said frame and defining first and second angularly disposed axes, one of said angularly disposed axes also being the axis of rotation of the associated rake wheel and the other of the angularly disposed axes also being the axis of rotation of the means relative to the frame for permitting adjustment of the position of the rake wheels, said axes defining an angle of less than 180° with each other and each defining an acute angle with said direction of travel.

2. A device as claimed in claim 1, comprising locking means operatively associated with and locking said means in fixed position relative to said frame.

3. A device as claimed in claim 2 wherein said means comprises first and second connected axle portions defining said angularly disposed axes, the latter said axes being angularly disposed at an angle of at least 140°.

4. A device as claimed in claim 3 comprising a sleeve operatively associated with each of said rake wheels for supporting one of said axle portions, said locking means axially and rotationally locking the latter said axle portion in said sleeve.

5. A device as claimed in claim 4 comprising a hood on one of said axle portions for deflecting material raised from the ground.

6. A device as claimed in claim 4, wherein said sleeve and latter said axle portion define alignable apertures, comprising a pin insertable in the apertures for preventing displacement between said sleeve and axle portion.

7. A device claimed in claim 6 comprising a support rotatable on said axle member, said pin being operatively associated with said support.

8. A device as claimed in claim 7 comprising a spring operatively associated with said support to urge said pin into engagement with the apertures.

9. A device as claimed in claim 8 comprising a handle on said pin.

10. A device as claimed in claim 1, wherein said frame comprises an axle member, and a beam supporting said axle means and thereby said rake wheels, said beam being supported on said axle member for rotation about a substantially horizontal axis relative to said frame.

11. An agricultural implement comprising a frame, support means supporting said frame for rotation relative to a horizontal axis, a beam, support means coupling said beam to said frame for rotation relative to a horizontal axis, a plurality of rake wheels and, support means supporting said rake wheels on said beam, the latter said support means defining angularly disposed axes corresponding respectively to axes of rotation of the latter said support means relative to said beam and axes of rotation for said rake wheels, the latter said support means being adjustable for positioning said rake wheels, the angularly disposed axes defining an angle of less than 180° with each other.

References Cited in the file of this patent

UNITED STATES PATENTS

| 2,729,931 | Hamilton | Jan. 10, 1956 |
| 2,819,578 | Wuster | Jan. 14, 1958 |

FOREIGN PATENTS

| 1,083,596 | France | June 30, 1954 |
| 729,874 | Great Britain | May 11, 1955 |
| 1,124,097 | France | June 25, 1956 |
| 188,133 | Austria | Dec. 27, 1956 |
| 1,136,039 | France | Dec. 29, 1956 |